United States Patent
Martini (10) Patent No.: US 8,904,483 B1
(45) Date of Patent: Dec. 2, 2014

(54) SERVING APPROVED RESOURCES

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/226,645

(22) Filed: Mar. 26, 2014

(51) Int. Cl.
*H04L 29/06* (2006.01)

(52) U.S. Cl.
CPC .................................. *H04L 63/0227* (2013.01)
USPC .................................................. 726/2; 726/11

(58) Field of Classification Search
USPC .......................................................... 726/2
See application file for complete search history.

(56) References Cited

U.S. PATENT DOCUMENTS

2008/0109871 A1\* 5/2008 Jacobs ............................. 726/1
2013/0333026 A1\* 12/2013 Starink et al. ................. 726/22

\* cited by examiner

*Primary Examiner* — Yogesh Paliwal
(74) *Attorney, Agent, or Firm* — Fish & Richardson P.C.

(57) ABSTRACT

First data that identifies forbidden resources hosted outside a network that client devices on the network are not permitted to access, and second data that associates, for each forbidden resource, a permitted resource that the client devices on the network are permitted to access is maintained. Each permitted resource offers comparable services as its associated forbidden resource. A request from a client device for a forbidden resource is intercepted. The request is redirected to a permitted resource associated with the requested forbidden resource.

18 Claims, 5 Drawing Sheets

SERVING APPROVED RESOURCES

The present document relates to computer networking

BACKGROUND

A computer network is a collection of computers and other hardware interconnected by communication channels that allow sharing of resources and information. Communication protocols define the rules and data formats for exchanging information in a computer network. Clients on a computer network can be configured to request resources (e.g., webpages, data) from servers inside and outside of the network.

SUMMARY

In one aspect, a method is performed by a data apparatus. The method includes maintaining (i) first data that identifies forbidden resources hosted outside a network that client devices on the network are not permitted to access, and (ii) second data that associates, for each forbidden resource, a permitted resource that the client devices on the network are permitted to access. Each permitted resource offers comparable services as its associated forbidden resource. The method further includes intercepting a request from a client device for a forbidden resource. The method further includes redirecting the request to a permitted resource associated with the requested forbidden resource.

Implementations can include any, all, or none of the following features. The forbidden resources include cloud applications under different administrative control than the network is under. At least one of the permitted resources includes a cloud application hosted outside of the network that is under the same administrative control as the network is under. At least one of the permitted resources includes a cloud application hosted on the network. At least one of the forbidden resources includes a pubic version of a particular cloud application and the permitted resource includes a private version of the particular cloud application. Redirecting the request to a permitted resource associated with the requested forbidden resource further includes redirecting the requests to a webpage hosted on the network, the webpage hosted on the network including human-readable explanations for the redirection. The method including receiving, from an update server off the network and under a different administrative control than the network is under, third data that identifies newly identified forbidden resources; updating the first data with the third data; and update the second data with new permitted resources for the newly identified forbidden resources in the third data. One of the forbidden resources includes one feature of a website that offers a plurality of features. The data apparatus includes a plurality of hardware devices, each hardware device include a separate processor and memory unit; wherein a first hardware devices is configured to: route traffic to and from the client devices into and out of the network; intercept requests from the client devices for the forbidden resources; and redirect the request to a second hardware device on the network; and wherein the second hardware device is configured to: route traffic between the client devices and a permitted resource.

In one aspect, a system includes one or more processors configured to execute computer program instructions. The system further includes computer storage media encoded with computer program instructions that, when executed by one or more processors, cause a computer device to perform operations includes maintaining (i) first data that identifies forbidden resources hosted outside a network that client devices on the network are not permitted to access, and (ii) second data that associates, for each forbidden resource, a permitted resource that the client devices on the network are permitted to access. Each permitted resource offers comparable services as its associated forbidden resource. The operations further include intercepting a request from a client device for a forbidden resource. The operations further include redirecting the request to a permitted resource associated with the requested forbidden resource a system includes one or more processors configured to execute computer program instructions.

Implementations can include any, all, or none of the following features. The forbidden resources include cloud applications under different administrative control than the network is under. At least one of the permitted resources includes a cloud application hosted outside of the network that is under the same administrative control as the network is under. At least one of the permitted resources includes a cloud application hosted on the network. At least one of the forbidden resources includes a pubic version of a particular cloud application and the permitted resource includes a private version of the particular cloud application. Redirecting the request to a permitted resource associated with the requested forbidden resource further includes redirecting the requests to a webpage hosted on the network, the webpage hosted on the network including human-readable explanations for the redirection. The operations further include, from an update server off the network and under a different administrative control than the network is under, third data that identifies newly identified forbidden resources; updating the first data with the third data; and update the second data with new permitted resources for the newly identified forbidden resources in the third data. One of the forbidden resources includes one feature of a website that offers a plurality of features. The data apparatus includes a plurality of hardware devices, each hardware device include a separate processor and memory unit; wherein a first hardware devices is configured to: route traffic to and from the client devices into and out of the network; intercept requests from the client devices for the forbidden resources; and redirect the request to a second hardware device on the network; and wherein the second hardware device is configured to: route traffic between the client devices and a permitted resource.

In one aspect, a computer storage media is encoded with computer program instructions that, when executed by one or more processors, cause a computer device to perform operations includes maintaining (i) first data that identifies forbidden resources hosted outside a network that client devices on the network are not permitted to access, and (ii) second data that associates, for each forbidden resource, a permitted resource that the client devices on the network are permitted to access. Each permitted resource offers comparable services as its associated forbidden resource. The operations further include intercepting a request from a client device for a forbidden resource. The operations further include redirecting the request to a permitted resource associated with the requested forbidden resource.

Implementations can include any, all, or none of the following features. Redirecting the request to a permitted resource associated with the requested forbidden resource further includes redirecting the requests to a webpage hosted on the network, the webpage hosted on the network including human-readable explanations for the redirection.

The systems and processes described here may be used to provide a number of potential advantages. By keeping a list of forbidden resources and another list of associated permitted resources that offer comparable service, a network administrator can prevent access to potentially dangerous resources while still providing the functionality that users are interested in. In some cases, a user requesting a forbidden resource can be redirected to an intermediate webpage that explains the reason for the redirect before being taken to a comparable permitted resource. Redirection from forbidden to approved resources can direct users to resources that are supported by their organizations Information Technology department.

Other features, aspects and potential advantages will be apparent from the accompanying description and figures.

DESCRIPTION OF DRAWINGS

Like reference symbols in the various drawings indicate like elements

DETAILED DESCRIPTION

A network gateway that routes traffic into and out of a network can be configured to keep a list of forbidden resources as well as a list of permitted resources that offer similar functionality. When the network gateway detects a client on the network requesting a forbidden resource, the network gateway can issue a redirect to the client, pointing at a permitted resource with similar functionality.

For example, a user on a corporate network needs to transfer a large file. The user may be unaware that the corporate network includes a server offering an approved file transfer service, and the user may attempt to reach an unauthorized file transfer service hosted on the Internet. When the user attempts to browse to the unauthorized file transfer service, the network's gateway may redirect the user's browser to a webpage describing the reasons that the supported file transfer service must be used (e.g., to protect the confidentiality of corporate data). From that webpage, the user may navigate or be redirected to the approved file transfer service.

Figure 1:
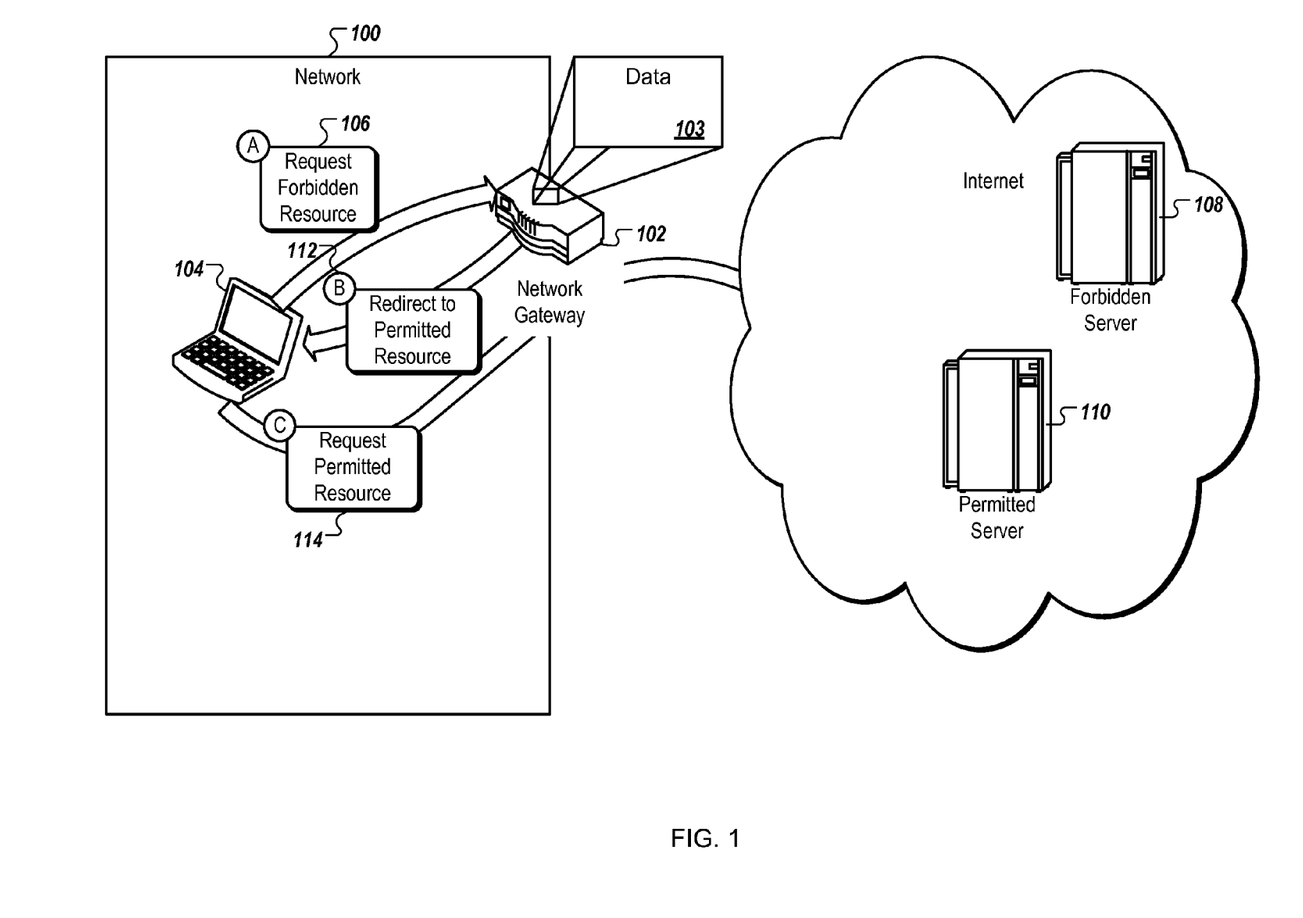
FIG. 1 is a block diagram of an example computer network that restricts access to forbidden resources.

FIG. 1 is a block diagram of an example computer network 100 that restricts access to forbidden resources. The network 100 includes a network gateway 102 and a browser device 104, which represents any appropriate computing device capable of browsing resources inside or outside of the network 100. While not shown for clarity's sake, the network 100 can include other elements including, but not limited to, wireless and/or wired access points, file and/or application servers, routers, and network cables, as well as additional browser devices 206, and network gateways 102.

The network 100 can be configured to route some or all of the traffic into and out of the network 100 through the gateway 102. The gateway 102 can inspect the traffic and, optionally, modify or drop some of the messages. For example, the gateway 102 may inspect network traffic to enforce security policies, prevent malicious software from entering the network, etc. One type of security policy enforced by the gateway 102 may be a policy that prevents access to forbidden resources but that also offers access to similar resources that are permitted.

For example, the browser device 104 may generate a request 106 for a forbidden resource hosted on a server 108. This resource may be any appropriate type of computer data or service, including, but not limited to, hosted applications (sometimes called cloud apps), webpages, or data repositories. In this example, the browser device 104 has created a request 106 to create new wiki (a user-editable website) on the forbidden server 108. The browser device 106 addresses the request 106 with the address of the forbidden server 108 and attempts to send the request 106 to the forbidden server 108.

The network gateway 102 can intercept the request 106 and examine the request 106 to determine if it is a request for a forbidden resource. For example, the network gateway 102 may store or have access to data 103 that i) identifies forbidden resources and ii) identifies permitted resource that offer comparable services to the forbidden resources. If the gateway 102 determines that the request 106 is a request for one of the forbidden resources, the gateway can identify an associated permitted resource on a server 110, and issue a redirect 112 pointing to the permitted resource or server 110 to the client device.

In response to receiving the redirect 112, the client device 106 can request 114 the permitted resource from the server 110. This request 114, when examined by the gateway 102, may be identified as a request for a permitted resource. As such, the gateway 102 may determine not to intercept the request and may instead route the request 114 to the server 110. The server 110, in turn, may then serve the requested resource to the client device 104.

In some cases, a website can offer more than one resource. For example, a social media site may allow users to post status updates, upload media, and chat with other users. Each of those three functions may be considered different resources, even though they are all offered by a single website.

In such cases, it is possible to configure the gateway 102 and the data 103 to consider some of the resources as forbidden and some of the resources as permitted. In the example of the social network, the media upload may be classified as forbidden, while the status update and chat features may be classified as permitted. In such a case, a user of the client device 104 may browse the social media website without interference, until the user attempts to upload media to the website. At that point, the gateway 102 may redirect the browser device 104 to a different, permitted media upload resource.

Figure 2:
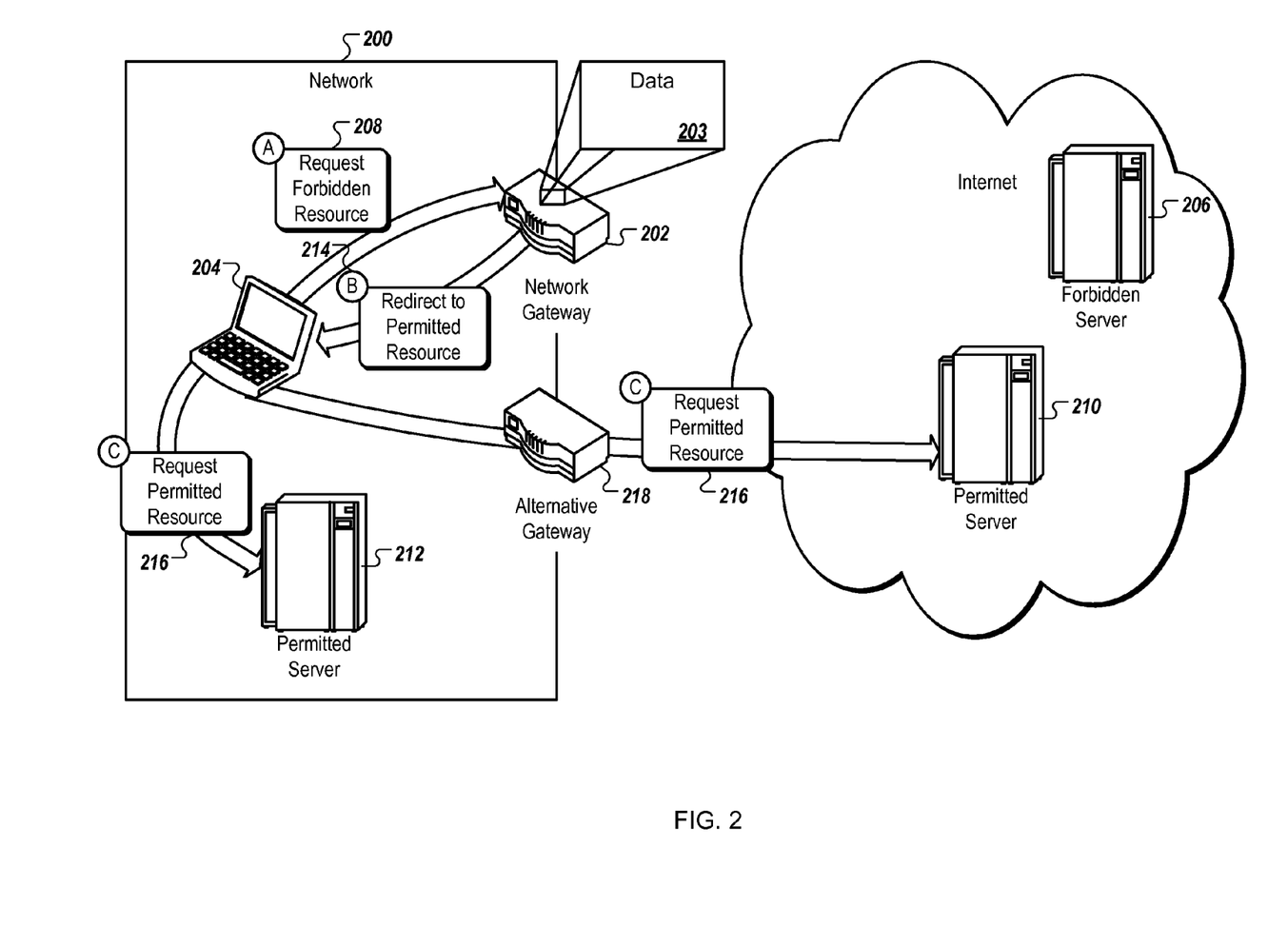
FIG. 2 is a block diagram of another example computer network that restricts access to forbidden resources.

FIG. 2 is a block diagram of another example computer network 200 that restricts access to forbidden resources. The network 200 includes a network gateway 202 and a browser device 204, which represents any appropriate computing device capable of browsing resources inside or outside of the network 200, and a server 212, which represents any appropriate computing device capable of serving resources to requesting clients. While not shown for clarity's sake, the network 200 can include other elements including, but not limited to, wireless and/or wired access points, file and/or application servers, routers, and network cables, as well as additional browser devices 204, network gateways 202, and severs 212.

The client device 204 may create and send a request 208 for a forbidden resource on a server 206. The network gateway 202, using data 203, may determine that the request 208 is a request for a forbidden resource and may identify one or more associated permitted resources.

In one example, the gateway 202 may issue a redirect 214 that identifies a permitted resource available on the server 212, which is on the network 200. The client device 204 may, in response to receiving the redirect 214, request 216 the permitted resource from the server 212. In some cases, the server 212 may be configured to serve the permitted resource to the client device 204 in response to the received request 216. In some other cases, the server 212 may first server a webpage to the client device 204. This webpage may include, for example, a human readable explanation of why and/or how the client device 204 was redirected to the server 212. This explanation may include a description of a security policy that caused the redirection, as well as text written to explain to a reader why the policy exists (e.g., to enable logging, so that Information Technology support is available). After serving the webpage, the server 212 may then serve the permitted resource to the client device 204.

In another example, the gateway 202 may issue the redirect 214 that identifies a permitted resource available on a server 210 outside the network. This redirect 214 may also or alternatively specify that the client device 204 should access the permitted resource through an alternative gateway 218. The alternative gateway 218 may be a network gateway that is identical or different than the gateway 218. In some cases, the alternative gateway 218 may be used for load balancing purposes. In some cases, the alternative gateway 218 may be configured to monitor the network traffic between the client device 204 and the server 210. For example, the alternative gateway may act as a man-in-the-middle between the client device 204 and the server 210, decrypting and inspecting the traffic. As such, the alternative gateway 218 can, for example, log and apply security policies to the traffic.

Although not shown here, other configurations of the network 200 are possible. For example, the server 206 hosting the forbidden resource may be on the network 200. Such an example may arise, for example, when the user of the client device 204 is not part of a user group that is permitted to access all of the resources on a network 200. For example, the forbidden resource may be a database of customer financial data when the user does not have authorization to see all of this data. In such a case, the user may be redirected to a different database, possibly on the same server, that contains only the customer name and contact information.

Figure 3:
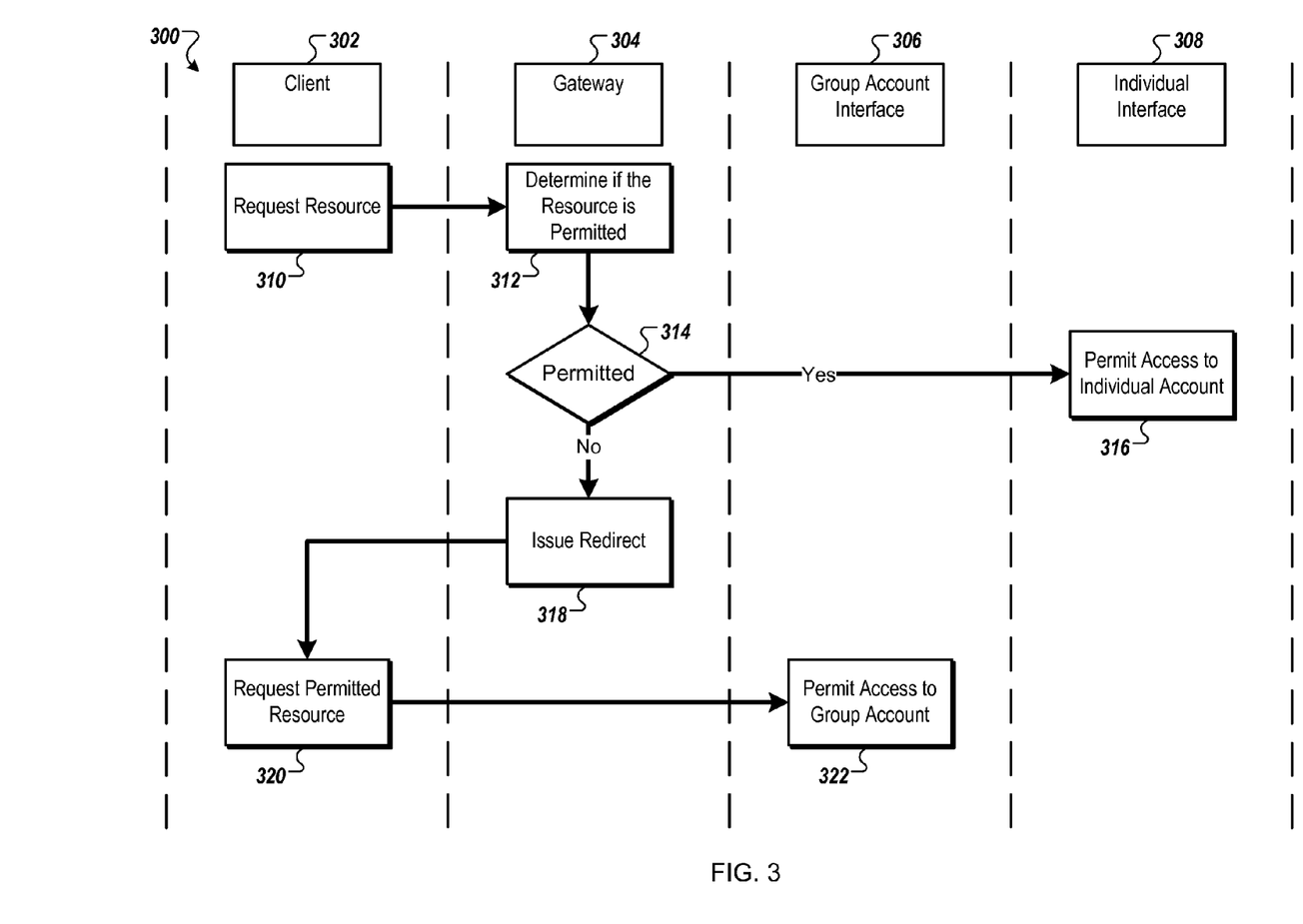
FIG. 3 is a swim-lane diagram of an example process for serving permitted resources.

FIG. 3 is a swim-lane diagram of an example process 300 for serving permitted resources. The process 300 is described with reference to a particular set of components. However, other components, including but not limited to the components shown in FIG. 1 and FIG. 2, can be used to perform the process 300.

A client 302 represents any appropriate computing device capable of browsing resources inside or outside of a network. A gateway 304 represents any appropriate computing device capable of routing traffic into and out of a network. Group account interface 306 and individual interface 308 represent two interfaces of a resource. This resource can provide support for two types of accounts—groups and individuals. Individual accounts are generally associated with a single user. They may have very limited logging or administrative support available to the individual, with those services being handled by the provider of the resource. The group accounts, on the other hand, are generally associated with some group or organization. The group accounts may each have their own individual log in information for each user, but the users are categorized into some group or organization. For example, a high school may contract with an email provider to offer email to students and faculty through a group account. Each student would have their own email address and authentication credentials, and the email service may expose administrative controls for the accounts to the university Information Technology department.

The client 302 can create a request for a resource (310). For example, a user may request to access the individual interface 308 of an email service provider. The client 302 may generate a Hypertext Transfer Protocol (HTTP) GET message that species the Uniform Resource Locator (URL) of the email service provider's individual interface 308 and pass that GET message to the gateway 304.

The gateway 304 can receive the request and determine if the resource is permitted (312). For example, the gateway 304 may compare the URL of the GET message with a list of URLs of forbidden resources. The list of forbidden resources may be indexed according to URL, Internet Protocol (IP) address, or any other appropriate indexing scheme. Additionally, the forbidden resources may only be forbidden to some, but not all, users. For example, the individual interface for the email provider may only be forbidden for student-type users.

If the resource is a permitted resource (314), the gateway 304 can route the request to the individual interface 308, and the individual interface 308 can permit access to an individual account (316). For example, if the user requesting the resource is an administrator-type or teacher-type user, and the individual interface 308 is a forbidden resource only for student-type users, the individual interface may be considered permitted for this request.

If the resource is a forbidden resource (314), the gateway 304 can intercept the request and issue a redirect to the client 302 (318). For example, if the user requesting the resource is a student-type user, the gateway 304 may consider the individual interface 308 a forbidden resource for this request. Instead of routing the request to the individual interface 308, the gateway 304 can create a redirect message to the URL of the group account interface 306 and send the redirect to the client 302. Many types of HTTP URL redirection are possible, including but not limited to 402 HTTP redirect, server-side scripting, frame redirects, and Apache mod_rewrite. In some cases, the redirect may be or may include a webpage with a human-readable explanation for the redirection.

The client 302 can receive the redirection and request the permitted resource (320). In response to receiving the request, the group account interface 306 can permit access to a group account (322). For example, the client 302 can create and send a second request, with this request including the URL of the group account interface 306. In response, the group account interface 306 can serve a log-in page for the user to log into with their school-specific email credentials.

Figure 4:
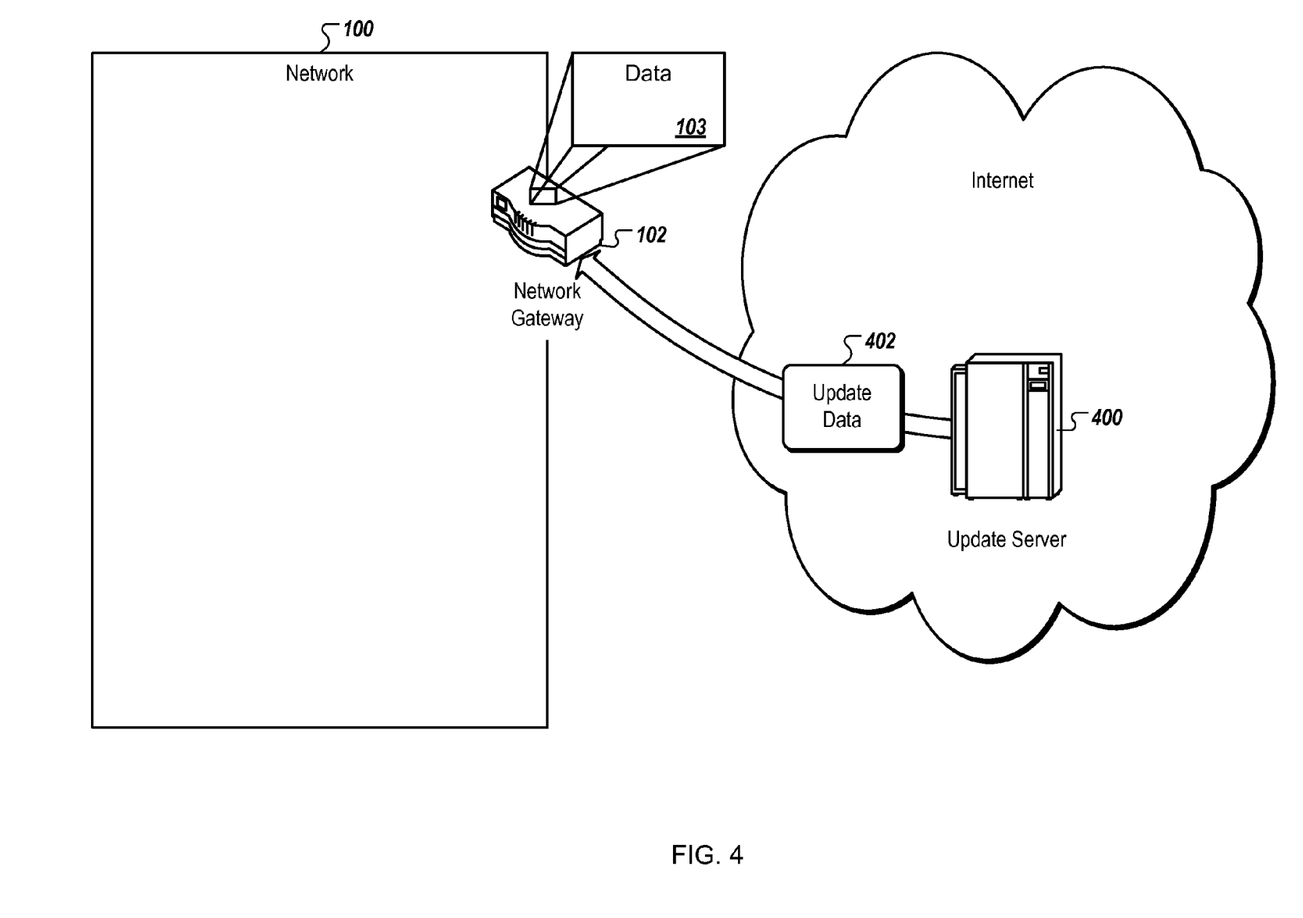
FIG. 4 is a block diagram of a system for updating a network gateway.

FIG. 4 is a block diagram of a system for updating the network gateway 102. While the gateway 102 is described here, it will be understood that this or a similar system may be used to update any appropriate sort of data processing device.

The data 103 may be maintained by the gateway 102 or another computing device. The data 103 can include, but is not limited to, i) first data that identifies forbidden resources hosted outside a network that client devices on the network are not permitted to access, and ii) second data that associates, for each forbidden resource, a permitted resource that the client devices on the network are permitted to access, wherein the permitted resource offers comparable services as their associated forbidden resource.

Over time, new resources become available and security policies change. To account for these new resources and policy changes, the data 103 may be updated. In some cases, the data 103 may be updated by an administrator of the network 100. For example, the network administrator may change a forbidden resource to a permitted resource if the resource implements a privacy policy acceptable to the network administrator. In another example, the administrator may become aware of a new resource from observing traffic into and out of the network 100. To edit the data 103, the administrator may log into the gateway 102 and make changes to the data 103.

Additionally or alternatively, an update server 400 may create update data 402 for the gateway 102. The update server may be operated by, for example, the network administrator, the manufacturer of the gateway 102, the vendor of the gateway 102, or a company that offers update data 402 as a service.

In one example, a network security company, possibly one that manufactures and/or sells gateways, may scan the internet for a wide variety of purposes—website categorization, malware and virus detection, security research, etc. From this investigation, it may compile a list resources that some administrators may wish to block. These resources may or may not contain malicious functionality. For example, an administrator of a network configured only to protect clients from malicious software may wish to block resources that act as insertion vectors for malicious software. In another example, an administrator of a network configured to protect client from malicious software and to limit sensitive data loss may wish to block resources that act as insertion vectors for malicious software and block resources that may allow users to infiltrate data.

The update server 400 can generate and distribute the update data 402 to the network gateway 102, and possibly one or more other gateways, not shown. This distribution may occur according to any appropriate distribution scheme, including but not limited to automated downloads, Rich Site Summary (RSS) subscriptions, or parcel delivery of a non-transitory, physical media (e.g., a compact disk).

The update data 402 may include data that identifies newly identified forbidden resources. The network gateway can receive the update data 402 and update the data 103 to include the newly identified forbidden resources. In some cases, the update data 402 may include a listing of permitted resources for each of the newly identified forbidden resources. In such a case, the network gateway 103 can update the data 103 with the listed permitted resources. In some cases, a network administrator or another use may select permitted resources to associate with the newly identified forbidden resources, and the network gateway 102 can update the data 103 with the user's associations.

Figure 5:
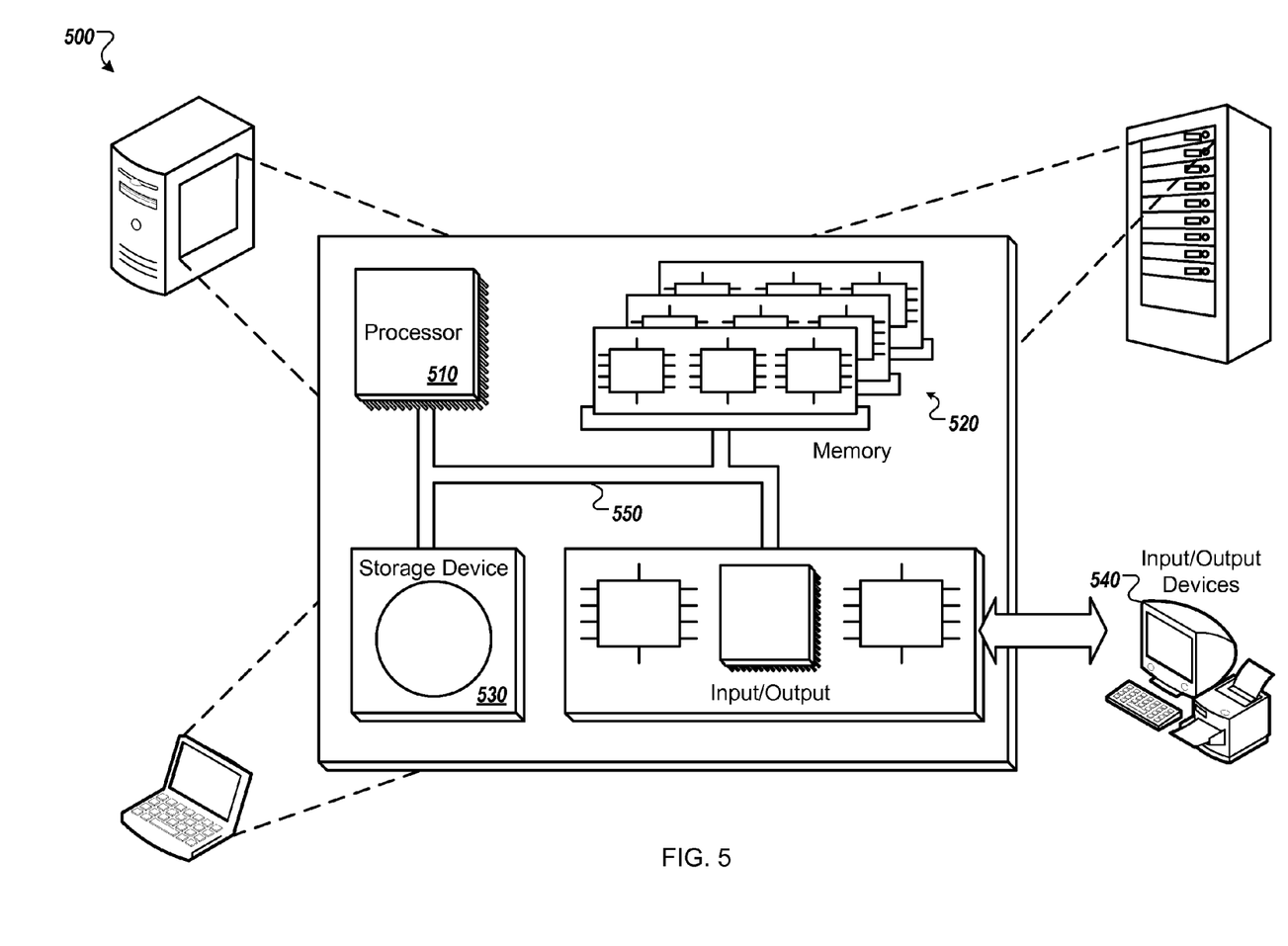
FIG. 5 is a schematic diagram that shows an example of a computing system.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

What is claimed is:

1. A method performed by data apparatus, the method comprising:
    maintaining (i) first data that identifies forbidden resources hosted outside a network that client devices on the network are not permitted to access, and (ii) second data that associates, for each forbidden resource, a permitted resource that the client devices on the network are permitted to access, wherein each permitted resource offers comparable services as its associated forbidden resource, wherein the forbidden resources comprise cloud applications under different administrative control than the network is under;
    intercepting a request from a client device for a forbidden resource; and
    redirecting the request to a permitted resource associated with the requested forbidden resource.

2. The method of claim 1 wherein at least one of the permitted resources comprises a cloud application hosted outside of the network that is under the same administrative control as the network is under.

3. The method of claim 1 wherein at least one of the permitted resources comprises a cloud application hosted on the network.

4. The method of claim 1 wherein at least one of the forbidden resources comprises a pubic version of a particular cloud application and the permitted resource comprises a private version of the particular cloud application.

5. The method of claim 1 wherein redirecting the request to a permitted resource associated with the requested forbidden resource further comprises redirecting the requests to a webpage hosted on the network, the webpage hosted on the network including human-readable explanations for the redirection.

6. The method of claim 1 further comprising:
    receiving, from an update server off the network and under a different administrative control than the network is under, third data that identifies newly identified forbidden resources;
    updating the first data with the third data; and
    update the second data with new permitted resources for the newly identified forbidden resources in the third data.

7. The method of claim 1 wherein one of the forbidden resources comprises one feature of a website that offers a plurality of features.

8. The method of claim 1 wherein the data apparatus comprises a plurality of hardware devices, each hardware device include a separate processor and memory unit;
    wherein a first hardware devices is configured to:
        route traffic to and from the client devices into and out of the network;
        intercept requests from the client devices for the forbidden resources; and
        redirect the request to a second hardware device on the network; and
    wherein the second hardware device is configured to:
        route traffic between the client devices and a permitted resource.

9. A system comprising:
    one or more processors configured to execute computer program instructions; and
    computer memory encoded with computer program instructions that, when executed by one or more processors, cause a computer device to perform operations comprising:
        maintaining (i) first data that identifies forbidden resources hosted outside a network that client devices on the network are not permitted to access, and (ii) second data that associates, for each forbidden resource, a permitted resource that the client devices on the network are permitted to access, wherein each permitted resource offers comparable services as its associated forbidden resource, wherein the forbidden resources comprise cloud applications under different administrative control than the network is under;
        intercepting a request from a client device for a forbidden resource; and
        redirecting the request to a permitted resource associated with the requested forbidden resource.

10. The system of claim 9 wherein at least one of the permitted resources comprises a cloud application hosted outside of the network that is under the same administrative control as the network is under.

11. The system of claim 9 wherein at least one of the permitted resources comprises a cloud application hosted on the network.

12. The system of claim 9 wherein at least one of the forbidden resources comprises a pubic version of a particular cloud application and the permitted resource comprises a private version of the particular cloud application.

13. The system of claim 9 wherein redirecting the request to a permitted resource associated with the requested forbidden resource further comprises redirecting the requests to a webpage hosted on the network, the webpage hosted on the network including human-readable explanations for the redirection.

14. The system of claim 9 the operations further comprising:
    receiving, from an update server off the network and under a different administrative control than the network is under, third data that identifies newly identified forbidden resources;
    updating the first data with the third data; and
    update the second data with new permitted resources for the newly identified forbidden resources in the third data.

15. The system of claim 9 wherein one of the forbidden resources comprises one feature of a website that offers a plurality of features.

16. The system of claim 9 wherein a data apparatus comprises a plurality of hardware devices, each hardware device include a separate processor and memory unit;
   wherein a first hardware devices is configured to:
      route traffic to and from the client devices into and out of the network;
      intercept requests from the client devices for the forbidden resources; and
      redirect the request to a second hardware device on the network; and
   wherein the second hardware device is configured to:
      route traffic between the client devices and a permitted resource.

17. A non-transitory computer storage media encoded with computer program instructions that, when executed by one or more processors, cause a computer device to perform operations comprising:
   maintaining (i) first data that identifies forbidden resources hosted outside a network that client devices on the network are not permitted to access, and (ii) second data that associates, for each forbidden resource, a permitted resource that the client devices on the network are permitted to access, wherein each permitted resource offers comparable services as its associated forbidden resource, wherein the forbidden resources comprise cloud applications under different administrative control than the network is under;
   intercepting a request from a client device for a forbidden resource; and
   redirecting the request to a permitted resource associated with the requested forbidden resource.

18. The computer storage media of claim 17 wherein redirecting the request to a permitted resource associated with the requested forbidden resource further comprises redirecting the requests to a webpage hosted on the network, the webpage hosted on the network including human-readable explanations for the redirection.

\* \* \* \* \*

UNITED STATES PATENT AND TRADEMARK OFFICE
CERTIFICATE OF CORRECTION

| | | |
|---|---|---|
| PATENT NO. | : 8,904,483 B1 | Page 1 of 1 |
| APPLICATION NO. | : 14/226645 | |
| DATED | : December 2, 2014 | |
| INVENTOR(S) | : Paul Michael Martini | |

It is certified that error appears in the above-identified patent and that said Letters Patent is hereby corrected as shown below:

In the Claims:

Column 9, line 53, in Claim 4, delete "pubic" and insert -- public --, therefor.

Column 10, line 49, in Claim 12, delete "pubic" and insert -- public --, therefor.

Signed and Sealed this
Seventeenth Day of March, 2015

Michelle K. Lee
*Director of the United States Patent and Trademark Office*